US011329975B1

(12) United States Patent
Deutschmann et al.

(10) Patent No.: US 11,329,975 B1
(45) Date of Patent: May 10, 2022

(54) AUTHORIZATION-BASED BEHAVIOMETRIC IDENTIFICATION

(71) Applicant: BehavioSec Inc, San Francisco, CA (US)

(72) Inventors: Ingo Deutschmann, Merseburg (DE); Per Burstrom, Lulea (SE)

(73) Assignee: BehavioSec Inc, San Francisco, CA (US)

( * ) Notice: Subject to any disclaimer, the term of this patent is extended or adjusted under 35 U.S.C. 154(b) by 0 days.

(21) Appl. No.: 17/403,996

(22) Filed: Aug. 17, 2021

(51) Int. Cl.
*H04L 9/00* (2022.01)
*H04L 29/06* (2006.01)

(52) U.S. Cl.
CPC ........ *H04L 63/083* (2013.01); *H04L 63/0876* (2013.01)

(58) Field of Classification Search
CPC ........ G06F 21/31; G06F 21/316; G06F 21/32; G06F 21/335; G06F 21/44; H04L 9/0866; H04L 9/3231; H04L 63/0861; H04L 63/10; H04L 63/101; H04L 63/102; H04L 63/083; H04L 63/0876
See application file for complete search history.

(56) References Cited

U.S. PATENT DOCUMENTS

| | | | | |
|---|---|---|---|---|
| 9,477,823 | B1* | 10/2016 | Ott | G06F 21/32 |
| 10,075,437 | B1* | 9/2018 | Costigan | H04L 63/0861 |
| 11,132,685 | B1* | 9/2021 | Novis | G06N 5/04 |
| 2008/0270172 | A1* | 10/2008 | Luff | G06Q 30/02 705/1.1 |
| 2017/0223018 | A1* | 8/2017 | Khalil | H04L 51/10 |
| 2018/0020024 | A1* | 1/2018 | Chao | G06F 17/18 |
| 2019/0220592 | A1* | 7/2019 | Liu | G06F 21/31 |
| 2021/0043019 | A1* | 2/2021 | Liao | G07C 9/00571 |
| 2021/0049846 | A1* | 2/2021 | Kashi | G07C 9/00912 |
| 2021/0357882 | A1* | 11/2021 | Kang | G06F 16/1805 |

* cited by examiner

*Primary Examiner* — Christopher J Brown
(74) *Attorney, Agent, or Firm* — Michael J. Feigin, Esq.; Feigin and Fridman LLC

(57) ABSTRACT

A method of granting or denying access to data is disclosed herein. A server requests behaviometric data from a device regarding a user thereof. If behaviometric data is provided, the server uses it to authenticate the user. If behaviometric data is not provided, the server requests device-identifying data from the device. If the device-identifying data matches data of a device from which a user previously consented to collection of behaviometric data, behaviometric data is collected. If not, a request for collection is made.

3 Claims, 5 Drawing Sheets

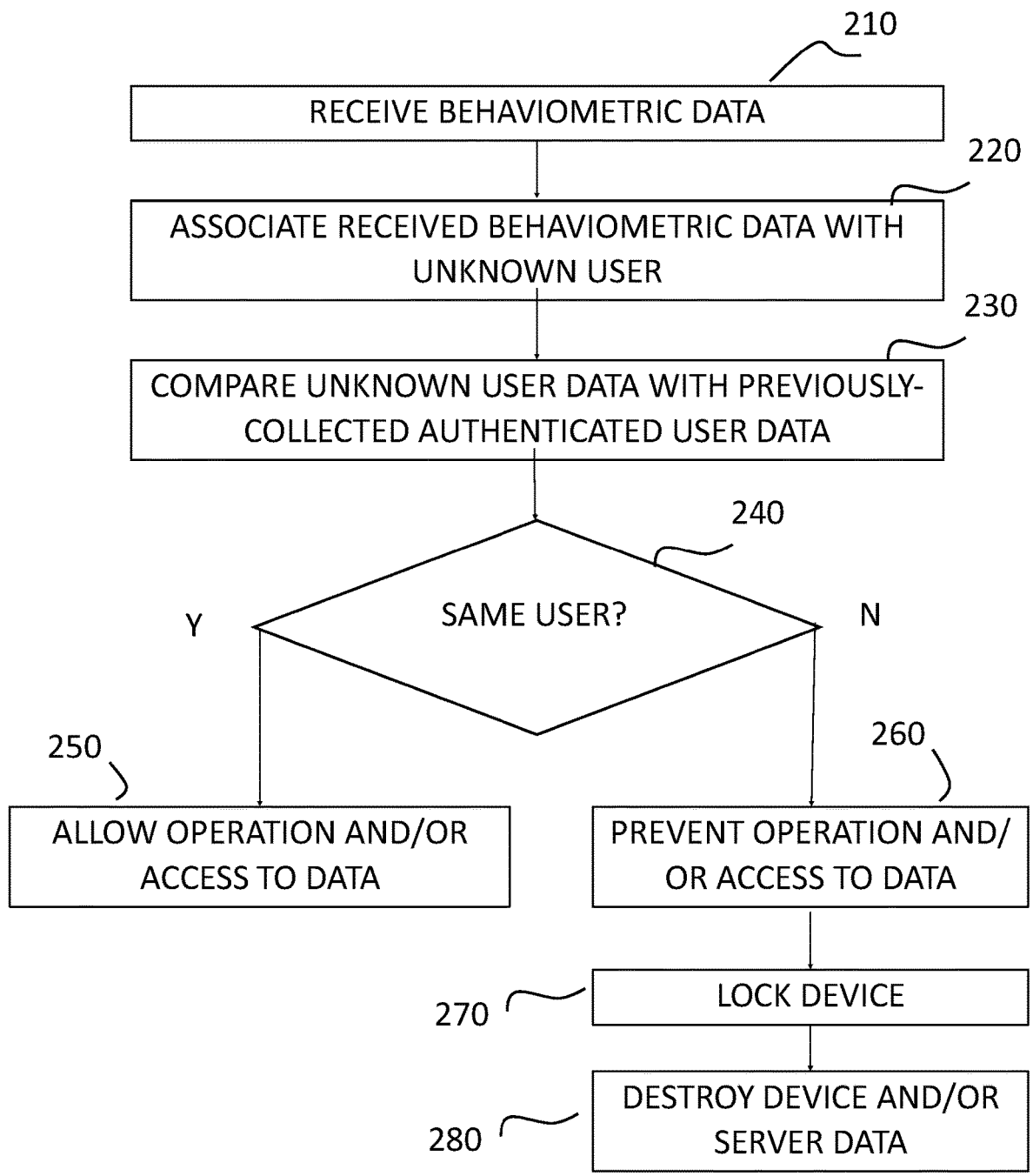

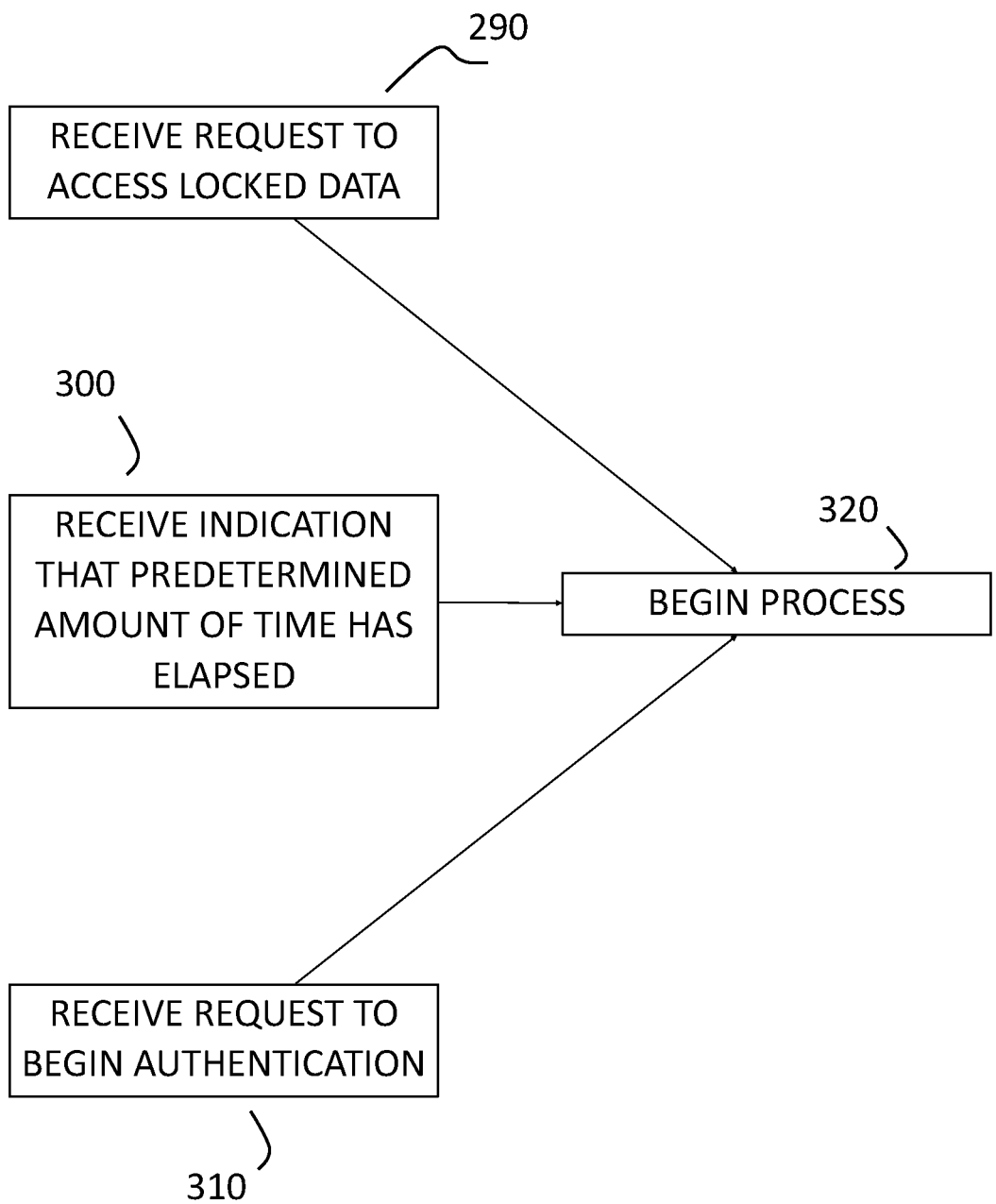

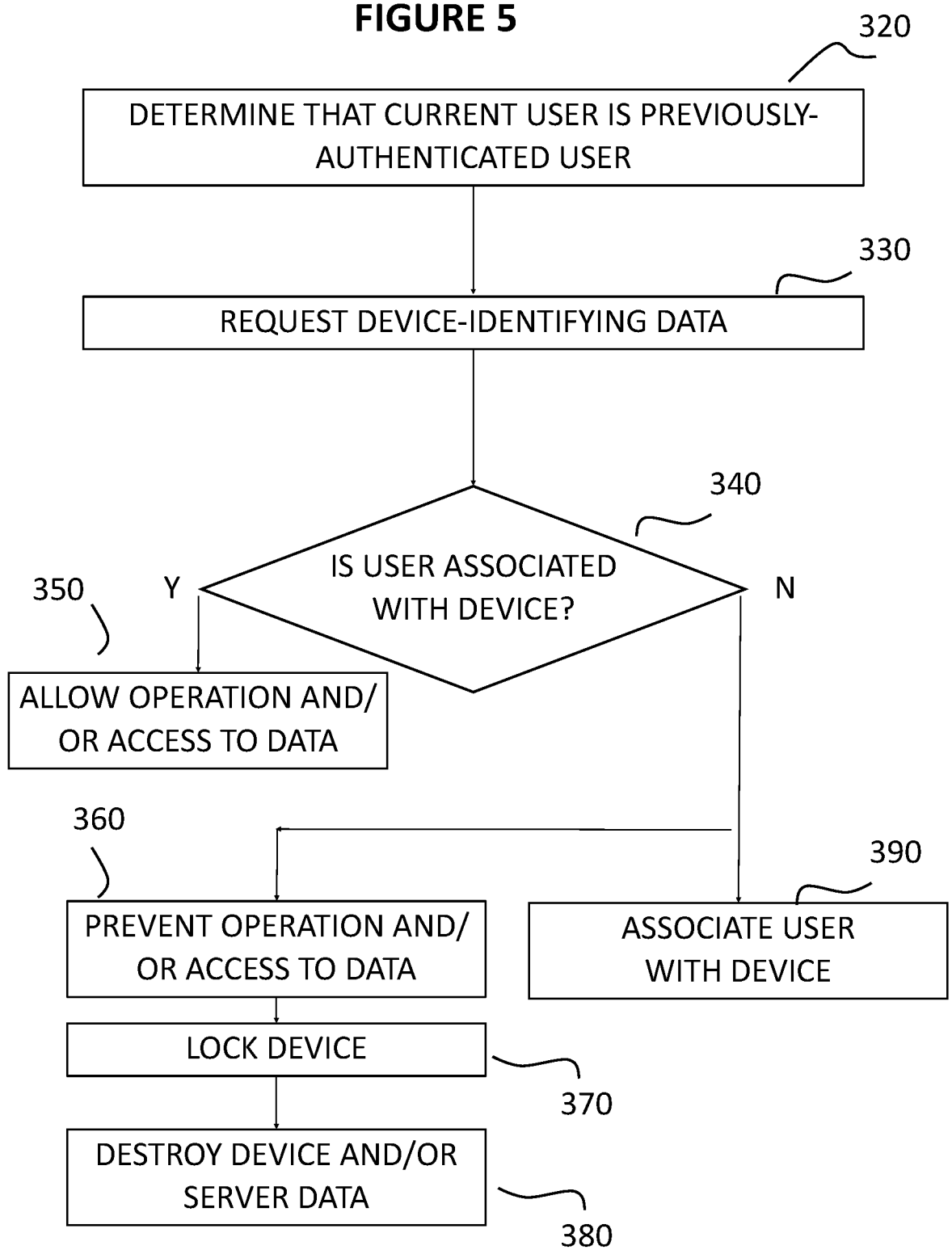

AUTHORIZATION-BASED BEHAVIOMETRIC IDENTIFICATION

FIELD OF THE DISCLOSED TECHNOLOGY

The disclosed technology relates to behaviometric user authentication and, more specifically to granting or denying access based on recognition of the user following a request for authorization to collect behaviometric data.

BACKGROUND

In today's environment, where many actions and transactions, including financial transactions, are accomplished via suitable applications run on a computing device, accurate authentication of the authorized, or legitimate user, is necessary to ensure safety of the action or transaction. Many systems use a multi-factor authentication process to determine whether or not a user attempting access to a website or an application is authorized to access the website or application, and/or to carry out the desired action or transaction.

Typically, authentication of users is achieved by password input, biometric recognition, behaviometric recognition based on collection of behaviometric data for a user, and other authentication mechanisms. However, collection of behaviometric data presents a quandary: On the one hand, such methods of authentication present opportunities for non-invasive and inconspicuous user authentication. On the other hand, unauthorized collection of such data may constitute a great moral and legal violation of privacy.

Thus, there is a need for a method of collection and authentication of behaviometric data which is as inconspicuous as possible without compromising user privacy. This and other problems are solved by embodiments of the disclosed technology, as described below.

SUMMARY OF THE DISCLOSED TECHNOLOGY

A method of denying access to data of embodiments of the disclosed technology includes the following steps:

Sending data via a server disposed and/or located at a first network node to an end user computer device residing at a second network node. This data contains at least a request for authorization for collection of behaviometric data on the end user device. The end user computer device is associated with an end user. "Behaviometric data" is defined as data regarding an unknown user including, but not limited to, key-down time, key-up time, key flight time, pressure readings, accelerometer readings, gyroscopic readings, radar readings, and/or facial recognition; and/or as any form of data regarding physical and/or behavior-based characteristics of a user.

Next, receiving, from the end user computer device, at the server, at least one response to the collection request. This response includes at least an authorization or a denial of authorization. Further, a failure to receive a response is considered, in some embodiments, a denial of authorization.

In response to a receipt of authorization, the method continues with a step of sending data via the server to the end user computer device, this data comprising a request for behaviometric data from the end user computer device. This behaviometric data is associated with an end user of the end user computer device.

By contrast, in response to a receipt of a denial of authorization, the method continues with the following steps:

Sending data via the server to the end user computer device, the data containing at least a request for device-identifying data regarding the end user device; making a determination, at the server, that the received device-identifying data is authentication credentials matching previously-collected credentials of a previously-recognized end user; and making a further determination as to whether the previously-recognized end user has previously responded to a previously-sent request of authorization for collection of behaviometric data with an authorization or with a denial of authorization.

As a result of a determination that the previously-recognized end user has previously responded to a previously-sent request of authorization for collection of behaviometric data with an authorization, sending data via the server to the end user computer device, the data including a request for behaviometric data on the end user computer device. This behaviometric data is associated with an end user of the end user computer device.

In contrast, as a result of a determination that the previously-recognized end user has previously responded to a previously-sent request of authorization for collection of behaviometric data with a denial of authorization, sending further data to the end user computer device, the further data being sufficient to request authorization for collection of behaviometric data on the end user computer device.

In various embodiments, the method further includes the following steps:

Following the sending of the data sufficient to request collection of behaviometric data via the server to the end user computer device, receiving at least one response including behaviometric data, which is associated with the unknown end user; comparing the collected behaviometric data, associated with the unknown user, with previously-collected behaviometric data associated with an authenticated user; determining heuristically, based on this comparison, a measure of similarity between the two sets of behaviometric data; and determining, based on this measure of similarity, if the unknown user is the authenticated user.

Based on a determination, by way of the comparison of behaviometric data, that the unknown user is not the authenticated user, preventing operation or access to at least some data stored on the device, or, based on a determination, by way of the comparison of behaviometric data, that the unknown user is the authenticated user, granting operation or access to at least some data stored on the device.

In some embodiments, the above-described method further includes the step of, in response to the determination that the unknown user is not the authenticated user, locking the device and/or destroying at least one collection of data stored on device at second network node and/or on the server at the first network node.

In some embodiments, the method is preceded by a step of receiving, at the server, from the end user computer device, a request to access locked data. In other embodiments, the method is preceded by a step of receiving, at the server, from the end user computer device, an indication that a predetermined amount of time has elapsed following a prior authentication. In further embodiments, the method is preceded by a step of receiving, at the server, from the end user computer device, a request to begin authentication.

In some embodiments of the disclosed technology, the collection of and sending of data of the above-described method are performed without significant perceptible change in user-faced operation of the end user computer device at the second network node.

In various embodiments, the above-described method further includes the following steps: Following the heuristic determination, requesting and/or accessing, on the server, device-identifying data regarding the end user device; determining, on the server, using the previously-made heuristic determination, if a user identified by behaviometric data is associated with the end user device; and, based on a determination that the identified user is not associated with the end user device, associating the identified user with the end user device.

In some embodiments, the method may further include a step of, based on a determination that the identified user is not associated with the end user device, preventing operation or access to at least some data stored on the end user device.

Described differently, a method of denying access to data of embodiments of the disclosed technology includes the following steps: Sending data, by way of a server disposed at a first network node, to a device disposed at a second network node, the data including a request for behaviometric data of a user of the device to be collected on the device and sent to the server; and sending data to the server, by way of the device, the data including either behaviometric data of the user of the device or a refusal to send such behaviometric data.

Following receipt of behaviometric user data, comparing, on the server, the received behaviometric data to previously-collected behaviometric data associated with an authenticated user; based on this comparison, heuristically determining a measure of similarity between the collected data and said previously-collected data; and, based on this measure of similarity, concluding whether or not the unknown user is the authenticated user.

Based on a conclusion that the unknown user is not the authenticated user, sending data to the device, by way of the server, including instructions to the device to prevent operation or access to at least some data stored there-on said device. In contrast, based on a conclusion that the unknown user is the authenticated user, sending data to the device, by way of the server, including instructions to the device to grant operation or access to at least some data stored there-on.

The method, in embodiments, further includes the following steps:

Following receipt of data including a refusal to send behaviometric data of the user of the device, sending further data to the device, by way of the server, the further data including a request for device-identifying data regarding the device; determining, based on the device-identifying data, at the server, that the received device-identifying data includes authentication credentials matching previously-collected credentials of a previously-recognized end user; and determining, at the server, if the previously-recognized end user has previously responded to a previously-sent request of authorization for collection of behaviometric data with an authorization.

Based on a determination that the previously-recognized end user has previously responded to a previously-sent request of authorization for collection of behaviometric data with an authorization, sending data via the server to the end device, including a request for behaviometric data on the device, the behaviometric data being associated with an end user of the device. In contrast, based on a determination that the previously-recognized end user has previously responded to a previously-sent request of authorization for collection of behaviometric data with a denial of authorization, sending further data to the device, the further data being sufficient to request authorization for collection of behaviometric data on the device.

The above-described method may, in embodiments, further include the following steps: determining, at the server, based on the device-identifying data, that the received device-identifying data includes unrecognized credentials; associating, on the server, the unrecognized credentials with the unknown end user and with the device; sending data to the device by way of said server, the data being sufficient to request authorization for collection of behaviometric data on the device; receiving on said server from said end user computer device at least one response to said collection request, said response including at least an authorization or a denial of authorization; and associating, on the server, the response with the unrecognized credentials, with the unknown end user, and with the device.

Described another way, a system, of embodiments of the disclosed technology, for denying access to data includes the following:

A server, disposed at a first network node, sending data to a device disposed at a second network node, the data including a request for behaviometric data of a user of the device to be collected on the device and sent to the server.

The device sending data to the server, the data comprising either behaviometric data of the user of the device or a refusal to send behaviometric data of the user.

The server, in response to the receipt of behaviometric data of the user, comparing the received behaviometric data to previously-collected behaviometric data associated with an authenticated user; determining heuristically, on the server, based on the comparing, a measure of similarity between the collected behaviometric data and the previously-collected behaviometric data; and determining, on the server, based on the measure of similarity, if the unknown user is the authenticated user.

The server, based on a determination that the unknown user is not the authenticated user, sending data to the device including instructions to the device to prevent operation or access to at least some data stored there-on; or, in contrast, based on a determination that the unknown user is the authenticated user, sending data to the device including instructions to the device to grant operation or access to at least some data stored there-on.

In contrast, in response to the receipt of a refusal to send behaviometric data of the user, the system may include: the server sending further data to the device, including a request for device-identifying data regarding the device; the server determining whether the received device-identifying data includes authentication credentials matching previously-collected credentials of a previously-recognized end user.

Following the server determining that the received device-identifying data includes authentication credentials matching previously-collected credentials of a previously-recognized end user, the server determining whether the previously-recognized end user has previously responded to a previously-sent request of authorization for collection of behaviometric data with an authorization.

Following the server determining that the previously-recognized end user has previously responded to a previously-sent request of authorization for collection of behaviometric data with an authorization, sending data via the server to the end device including a request for behaviometric data on the device, the behaviometric data being associated with an end user of the device.

In contrast, following the server determining that the previously-recognized end user has previously responded to a previously-sent request of authorization for collection of behaviometric data with a denial of authorization, sending further data to the device at the second network node, the further data being sufficient to request authorization for collection of behaviometric data there-on.

The system, in embodiments, further includes the server determining, based on the device-identifying data, at the server, that the received device-identifying data comprises unrecognized credentials; the server associating the unrecognized credentials with the unknown end user and with the device; the server sending data to the device requesting authorization for collection of behaviometric data on the device; the server receiving from the end user computer device at least one response to the collection request, the response including at least an authorization or a denial of authorization; and the server associating the response with the unrecognized credentials, with the unknown end user, and with the device.

The above-described system may include the server sending the data including a request for behaviometric data of a user thereof to be collected on the device and sent to the server in response to the server disposed at the first network node receiving, from the end user computer device at the second network node, a request to access locked data.

The above-described system may include the server sending the data including a request for behaviometric data of a user thereof to be collected on the device and sent to the server in response to the server disposed at the first network node receiving, from the end user computer device at the second network node, an indication that a predetermined amount of time has elapsed following a prior authentication.

The above-described system may include the server sending the data including a request for behaviometric data of a user thereof to be collected on the device and sent to the server in response to the server disposed at the first network node receiving, from the end user computer device at the second network node, a request to begin authentication.

In embodiments, the server;s collecting and sending of data is performed without significant perceptible change in user-faced operation of the end user computer device at the second network node.

The system, in some embodiments, may include the server, following the determination that the user identified by the behaviometric data is not associated with the end user device, preventing operation or access to at least some data stored on the end user device.

Any device or step to a method described in this disclosure can comprise or consist of that which it is a part of, or the parts which make up the device or step. The term "and/or" is inclusive of the items which it joins linguistically and each item by itself.

BRIEF DESCRIPTION OF THE DRAWINGS

FIG. 3 shows a method of using behaviometric data to determine whether to grant or deny access to at least some device data of embodiments of the disclosed technology.

FIG. 4 shows a method of beginning an authentication process of embodiments of the disclosed technology.

FIG. 5 shows a method of using behaviometric data to determine whether to grant or deny access to at least some device data of embodiments of the disclosed technology.

DETAILED DESCRIPTION OF EMBODIMENTS OF THE DISCLOSED TECHNOLOGY

A method of granting or denying access to data is disclosed herein. A server requests behaviometric data from a device regarding a user thereof. If behaviometric data is provided, the server uses it to authenticate the user. If behaviometric data is not provided, the server requests device-identifying data from the device. If the device-identifying data matches data of a device from which a user previously consented to collection of behaviometric data, behaviometric data is collected. If not, a request for collection is made.

Embodiments of the disclosed technology will become more clear in view of the following discussion of the figures.

Figure 1:
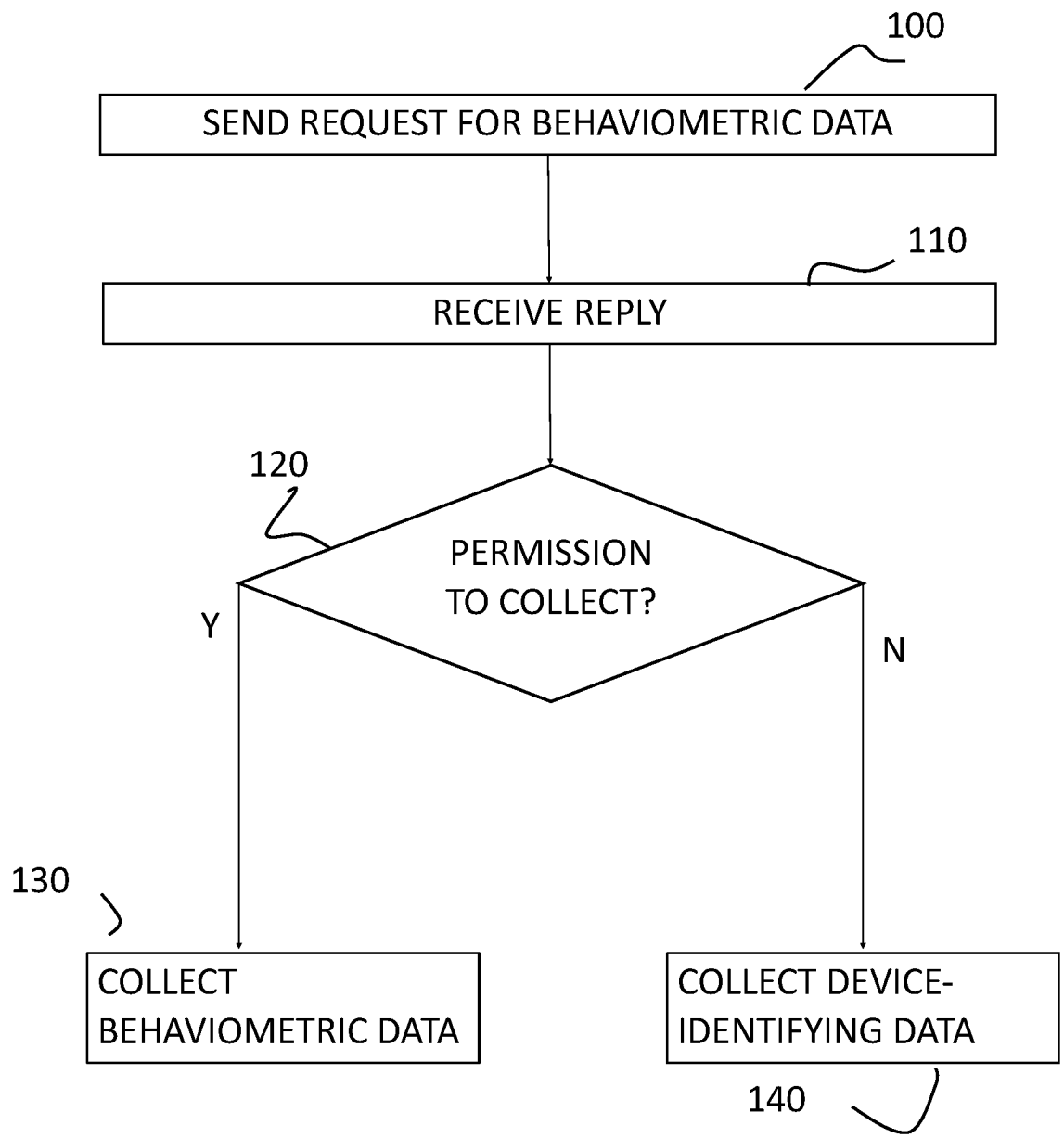
FIG. 1 shows a method of collecting identifying data of embodiments of the disclosed technology.

FIG. 1 shows a flow chart of steps for collecting identifying data of embodiments of the disclosed technology. In step 100, a request for permission to collect behaviometric data is sent from the server at a first network node to the device at a second network node by way of the network. In steps 110-120, the server receives a reply containing either granting or denial of permission to collect behaviometric data. If permission is granted, in step 130, the server sends instructions to the device to collect behaviometric data regarding the user and transmit the behaviometric data to the server. If permission is not granted, in step 140, the server sends instructions to the device to transmit device-identifying data.

In other embodiments, in step 100, the server sends a request to collect behaviometric data, rather than a request for permission to collect behaviometric data. The request in step 100 may be in a form of a query seeking whether or not the user has in the past explicitly given permission for behaviometric data to be collected. The request in step 100 may further be in any form such that the request is sent from the server to the device and/or so that a response there-to is sent from the device to the server without a user-perceptible change in device functionality. In various embodiments, in steps 110-130, the device responds to the server's request with behaviometric data, rather than with permission for collection of such data. In all steps, the term "server" may refer to a single server and/or to multiple servers located at various network nodes. Of these multiple servers, one or more may communicate with the device. An "unknown user" is defined as a user which may or may not be believed to be the authenticated user, or first user, until verified to be the first user, or authenticated user, based on biometric and/or behaviometric and/or username and password and/or two factor authentication comparisons between the users. "Biometric" is defined as "analysis of biological data" such as fingerprints, retina scans, and so forth.

Figure 2:
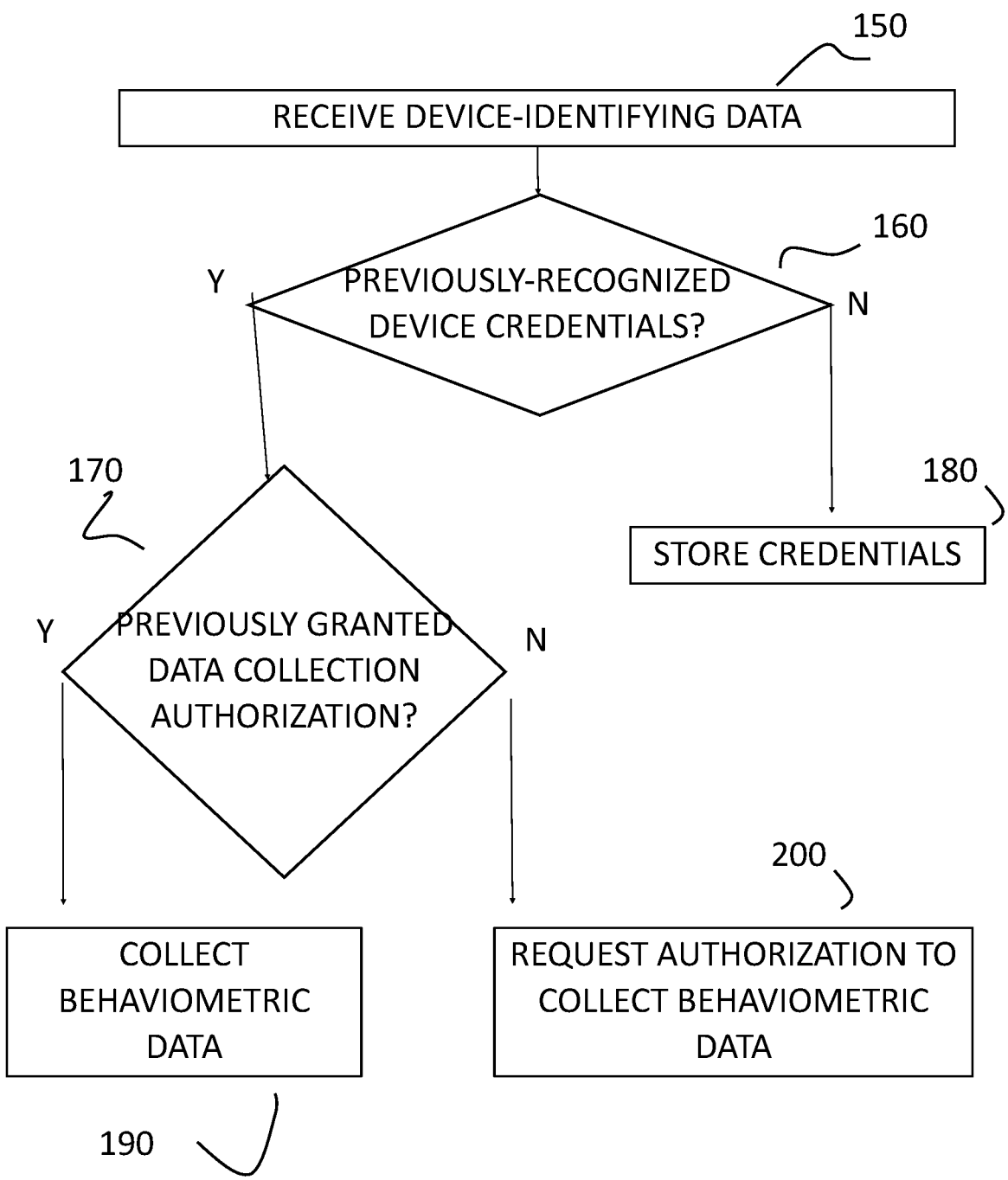
FIG. 2 shows a method of using device-identifying data to determine authorization to collect behaviometric data of embodiments of the disclosed technology.

FIG. 2 shows a flow chart of steps for using device-identifying data to determine authorization to collect behaviometric data of embodiments of the disclosed technology. In step 150, the server receives device-identifying data from the device. Step 150 may take place following step 140. In step 160, the device-identifying data is compared to one or more sets of previously-recognized and previously-stored device credentials. If the device-identifying data matches none of the previously-stored credentials, the data is stored as a new set of credentials in step 180.

If the data does match at least one set of previously-stored credentials, in step 170, the server determines if the user of the device matching the previously-stored credentials has previously granted authorization to collect data. If authorization has previously been granted, the server sends instructions to the device to begin collecting behaviometric data and transmitting it to the server in step 190. If authorization has not previously been granted, in step 200, the server sends instructions to the device to request authorization from the user to collect behaviometric data regarding the user.

In various embodiments, the request for authorization of step 200 is in a form of a user-facing request for input, such as a pop-up or check box, on a screen on the device. In embodiments, the request of step 200 is sent from the server to the device and/or so that a response there-to is sent from the device to the server with a user-perceptible change in device functionality. The request of step 200 may further be in any form of request requiring direct user input for authorization and/or denial thereof. The previously-granted authorization of step 170, by contrast, may be authorization granted by way of response to an explicit/direct and/or an implicit/indirect request for authorization.

In embodiments of the disclosed technology, following the request for user authorization in step 200, the device sends one of an authorization or a denial of authorization to the server. Following receipt of authorization, the server may perform steps of, on the server, associating the user's behaviometric data and/or the device credentials with the received authorization and/or sending data to the device including instructions to collect behaviometric data regarding the user and/or transmit behaviometric data regarding the user to the server.

By contrast, following receipt of denial of authorization, the server may perform steps of, on the server, associating the user's behaviometric data and/or the device credentials with the received denial of authorization and/or sending data to the device including instructions to lock the device and/or sending data to the device including instructions to destroy a portion of data thereon and/or sending data to the device including instructions to prevent a portion of usability thereof.

FIG. 3 shows a flow chart of steps for using behaviometric data to determine whether to grant or deny access to at least some device data of embodiments of the disclosed technology. In step 210, the server receives behaviometric data regarding the unknown user from the device. In embodiments, the behaviometric data received in step 210 may be collected by a single device or by a set of multiple devices. In step 220, the server associates the received behaviometric data with the unknown user. In steps 230-240, the collected data regarding the unknown user is compared to at least one set of data regarding at least one previously-authenticated user.

In embodiments, the comparison in steps 230-240 may include the following additional steps: first, the server requesting and receiving from the device data including device-identifying data regarding the device. Next, a first comparison is made, in which the received behaviometric data is compared to previously-collected behaviometric data belonging to previously-recognized authorized users of the device and/or of devices with credentials matching the received device-identifying data. Next, a second comparison is made, in which the received behaviometric data is compared to previously-collected behaviometric data belonging to previously-recognized authorized users of all devices. Further comparisons may be made, in various embodiments, such as comparisons to databases of known criminals. Depending on the results of these first and second comparisons, as well as any and all other comparisons made, the server may perform several actions, including but not limited to: sending instructions to the device to lock the device, sending instructions to the device to permit and/or prevent operation thereof, sending instructions to the device to grant and/or deny access to data stored thereon, sending instructions to the device to destroy data stored thereon, destroying data stored on the server, and/or sending an alert to law enforcement.

In step 250, if the server determines that a high likelihood exists that the unknown user is the same as at least one previously-authenticated user, the server sends instructions to the device to at least allow operation thereof and/or access to data stored thereon. The server may further send instructions to the device to at least allow operation of a portion thereof and/or access to a portion of data stored thereon. The server may further transmit previously-requested secure data stored on the server to the device and/or collect secure data stored on the device.

By contrast, in steps 260-280, if the server determines that a low likelihood exists that the unknown user is the same as at least one previously-authenticated user, the server sends instructions to the device to lock the device. The server further sends instructions to the device to destroy at least a portion of data stored on the device. The server further destroys at least a portion of data stored on the server and/or sends instructions to at least one other server to destroy data stored on the at least one other server.

In embodiments, the high likelihood of step 250 and/or the low likelihood of steps 260-280 may be a predetermined percentage and/or likelihood. The high likelihood of step 250 and/or the low likelihood of steps 260-280 may further be one of several predetermined or non-predetermined percentages and/or likelihood levels based on external circumstances, including but not limited to device orientation, external light levels/saturation, and/or forms of behaviometric data collected by the device and/or transmitted by the device to the server. "Locking" the device is defined as blocking access to at least a portion of the usability of the device and/or data stored on the device, permanently and/or temporarily.

FIG. 4 shows a flow chart of steps for beginning an authentication process of embodiments of the disclosed technology. In step 290, the server receives data from the device including a request to access locked data stored on the server and/or on the device, leading to the authentication process beginning in step 320. In step 300, the server receives an indication from the device that a predetermined amount of time has elapsed following a prior authentication process, leading to step 320. In step 310, the server receives data from the device including a request to begin an authentication process, leading to step 320.

In various embodiments, any and/or all of steps 290-310 may take place prior to step 320. In embodiments, the prior authentication process of step 300 may take a form of at least a portion of the method described herein. In some embodiments, the request of step 310 may take a form including, but not limited to, any or all of: opening, turning on, and/or attempting to operate a device; attempting to open an app; entering a username and/or password; selecting a 'login' option; attempting to edit and/or transmit secure data from the device to the server; and/or attempting to access information at a specified security level.

FIG. 5 shows a flow chart of steps for using behaviometric data to determine whether to grant or deny access to at least some device data of embodiments of the disclosed technology. In step 320, the server determines that there is a high likelihood that the unknown user is a previously-authenticated user. In step 330, the server sends data to the device including instructions to send device-identifying data regarding the device.

In step 340, the server determines whether an association has been made between the previously-authenticated user and a device with previously-stored credentials matching the device-identifying data. If the server determines that the previously-authenticated user has been associated with a device with previously-stored credentials matching the device-identifying data, in step 350, the server sends instructions to the device to allow operation thereof and/or to allow access to data stored thereon. In various embodiments, in step 350, the server may further send secure data to the device and/or collect secure data from the device.

By contrast, if the server determines that an association has not been made between the previously-authenticated user and a device with previously-stored credentials matching the device-identifying data, in step 390, the server associates the previously-authenticated user with the device. Alternatively, in steps 360-380, the server sends instructions to the device to prevent operation thereof and/or to prevent access to data stored thereon, and to lock the device. The server further sends instructions to the device to destroy at least a portion of data stored on the device. The server further destroys at least a portion of data stored on the server and/or sends instructions to at least one other server to destroy data stored on the at least one other server.

In embodiments, the method includes any and/or all of steps 360-390 following the determination that an association has not been made between the previously-authenticated user and a device with previously-stored credentials matching the device-identifying data. Furthermore, following the determination that an association has not been made between the previously-authenticated user and a device with previously-stored credentials matching the device-identifying data, the method may include a further step of storing the credentials of the device in a was such that the credentials may be accessed at a future time. The credentials may be stored on the server, on a separate server, and/or on a separate database. In step 390, the association created between the previously-authenticated user with the device may be temporary and/or pending further verification.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A method of gaining consent to collect behaviometric data at a server, said method comprising steps of: sending a request for behaviometric data to an end-user device via a network connection, receiving a response from said end-user device indicating said request for behaviometric data is denied; sending instruction data to said end-user device preventing operation or access to at least some stored data on said device; sending further instruction data to said end-user device sufficient to cause said end-user device to collect behaviometric data at said end-user device; receiving an indication from said end-user device that a user of said end-user device has identified a specific known user; determining that said specific known user has provided previous consent to send behaviometric data to said server; sending a second request to said end-user device to send behaviometric data, said second request comprising data sufficient to obtain behaviometric data from said end-user device.

2. A method of granting consent to send collected behaviometric data from an end-user device to a server, said method comprising steps of: receiving, at said end-user device, a request to send behaviometric data to a server via a network connection; determining that a user of said end-user device is biometrically verified and if said user has consented to send behaviometric data via said network connection to said server; denying said request from said server to send said behaviometric data: preventing operation or access to at least some stored data on said end-user device; collecting behaviometric data at said end-user device; identifying said user as being a specific known user; determining, at said end-user device based on said collecting of behaviometric data at said end-user device, that said specific known user has provided previous consent to send behaviometric data to said server: sending an indication to said server that said server is authorized to receive said behaviometric data; receiving a second request from said server for behaviometric data associated with said specific user; sending said behaviometric data associated with said specific user to said server.

3. The method of claim 2, wherein before said step of determining that said specific known user has provided previous consent to send behaviometric data to said server, determining that said specific known user has not provided previous consent to send behaviometric data to said server; and requesting and receiving consent from said specific known user to collect behaviometric data associated with said user.

* * * * *